United States Patent

[11] 3,614,219

| [72] | Inventor | Richard K. Carlson<br>Chicago, Ill. |
|---|---|---|
| [21] | Appl. No. | 854,484 |
| [22] | Filed | Sept. 2, 1969 |
| [45] | Patented | Oct. 19, 1971 |
| [73] | Assignee | Bell & Howell Company<br>Chicago, Ill. |

[54] CONTROL LEVER SWITCHING MECHANISM
6 Claims, 6 Drawing Figs.

[52] U.S. Cl. .................................................. 352/178
[51] Int. Cl. .................................................. G03b 1/00
[50] Field of Search .................................... 352/174, 178, 176, 177

[56] References Cited
UNITED STATES PATENTS
3,062,091  11/1962  Akahane .................. 352/176
3,317,270  5/1967  Sho .......................... 352/178 X
3,376,094  4/1968  Baginski ................... 352/178 X

*Primary Examiner*—Louis R. Prince
*Assistant Examiner*—Joseph W. Roskos
*Attorney*—William F. Pinsak ABSTRACT: The invention contemplated concerns itself with switch structure which can be manually controlled or which may be locked to operate continuously freeing the hands of the photographer. A feature of the invention is a control lever which is fulcrummed and selectively operates with multiple electrical contacts which govern the operation of a prime mover in a motion-picture camera, and which controls a claw motivating the film in exposure through an apertured gear. A notched portion in the gear is engaged by a stop lug on the control lever to arrest the apertured gear in a position to block out all light from the film in the cartridge, when the camera is not in use.

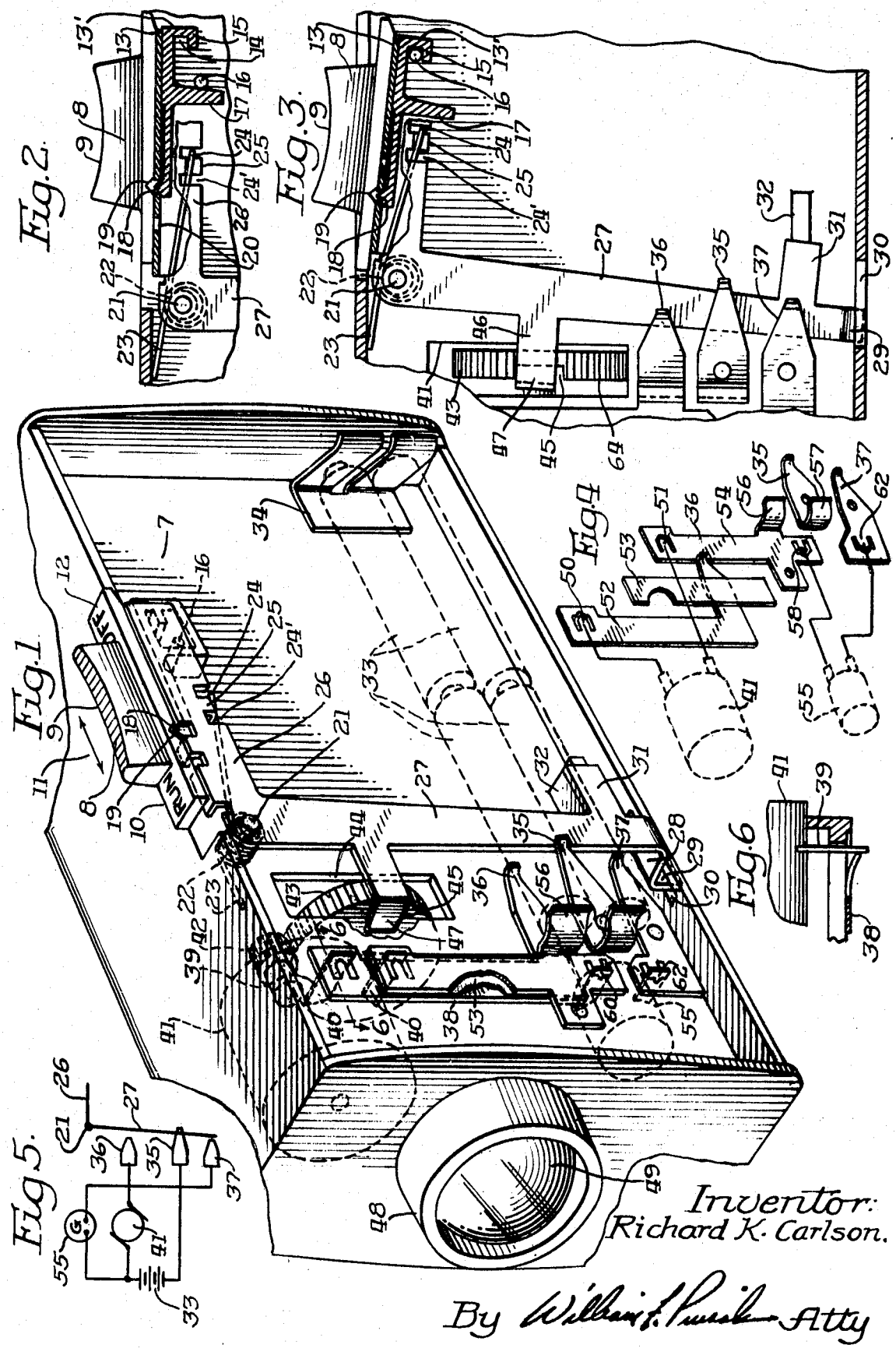

CONTROL LEVER SWITCHING MECHANISM

The invention relates to switch controls for motion-picture cameras which optionally can be set to operate a prime mover, and/or a film-feeding circuit which governs the operation of conventional claw means which drives a film under exposure.

It is an object of this invention to provide a switch control which may be operated manually and/or set fixedly relieving the operator to concentrate on photography.

It is another object of this invention to provide switch lever mechanism associated with said switch control which optionally energizes a prime mover circuit, and which energizes an electrical circuit for operating a conventional claw movement for feeding cartridge film for exposure.

It is another object of this invention to provide in drive gearing a spur gear member having an exposure opening in timing relationship with said claw movement.

It is another object of this invention to provide said spur gear with a locking notch which will automatically be engaged by a stop lug on said switch lever to arrest said spur gear and to shut out light completely from the interior confines of the camera in order to protect the film from exposure when the camera is not in use.

It is a further object of this invention to provide a solderless electrical connection whereby electrical terminals may be releasably connected electrically.

Further and other objects will be apparent from the description of the accompanying drawings, in which like parts are designated by like numerals.

IN THE DRAWINGS:

FIG. 1 is a perspective view of the inner structure of a camera indicated in "off" position.

FIG. 2 is a fragmentary cross-sectional view of the switch control in "run" position when it must be actuated or depressed downwardly to run the motor and the iris control.

FIG. 3 is a cross-sectional view of the switch control and actuating fulcrummed contact lever and showing all circuits closed.

FIG. 4 is an exploded view of the electrical contact elements in perspective relationship.

FIG. 5 is a diagrammatic view of the electrical circuits selectively closed by said contact lever and said electrical contact elements.

FIG. 6 is a sectional view taken substantially on lines 6—6 of FIG. 1 showing a flexible electrical contact structure which releasably makes and breaks electrical connections.

The various views reflect a structure 7 embodying the foregoing features and show a switching assembly consisting of a control 8 having an arcuate finger-actuating portion 9 which is knurled to furnish good contact.

The interior wall of the camera 6 has a flat spring 13 secured thereto and the guide and slide bracket 13' which is provided with a flexible extension terminating in a tooth 18 adapted to engage toothed recess 19 when the circuits hereinafter to be referred to are closed by depressing the control switch 8 and as long as it is held there by the finger the circuits controlling the iris and the film-driving mechanism will be closed. The switch control operates within the confines 14, a pin 16 and a lug 17 limiting the sliding movement of switch 8.

When it is desirable to relieve the photographer's finger, depressing and sliding the switch control 8 leftward, as shown in FIG. 3, the lip 15 is caused to be engaged by pin 16 thus maintaining the circuits closed without requiring said switch 8 to be held down. The hole 20 receives the tooth 18 when the camera switch is in off position and lip 15 is directly above pin 16 to prevent downward movement of switch 8 thereby locking the control lever 27 in an ineffective position.

A control lever 27 is fulcrummed at post 21 and is urged to normal position, as shown in FIG. 1, by a spring 22 biased at one of its ends 23 at the interior of the camera wall, its other end 24 being engaged in the slots 24' in the lever arm 26 of the lever 27.

The camera housing has secured interiorly thereof the motor 41 provided with electrical terminals 39 and 40 engaged releasably by spring tongue 50 and 51 to make good electrical contact with bar contact 52 and 54.

The bar contact 52 extends to form terminal contact 36. Bar contact 54 extends to form a spring contact 56 to be contacted by one end of a battery 33. A spring tongue 58 is formed in contact bar 54 and is connected to a terminal 60 of galvanometer 55. A sheet of insulating material 53 is positioned between bar contact 52 and bar contact 54 to provide independent circuit control for motor 41. Contact 35 is rigidly assembled to the housing and is connected as a ground terminal. Contact 35 has a spring contact 57 to be contacted by one end of a battery 33. Contact 37 is rigidly assembled to the housing and is connected to a second terminal 62 of galvanometer 55. Four batteries 33 are connected in series through a common connector 34 to provide the power for driving motor 41 and for the galvanometer circuit.

Referring to FIG. 3 depressing control 8 pivots control lever 27 clockwise about post 21. An extension 46 of control lever 27 has a stop lug 47 which is disengaged from the notch 45 in the spur gear 43 by the clockwise movement of control lever 27 to free the drive gearing for feeding the film. Control lever 27 is always in engagement with contact 35, before and after the clockwise movement, to provide a ground return connection for the electrical circuit. The lower end of contact lever engages contact 37 during the first portion of clockwise movement to energize an exposure control galvanometer 55 before the motor 41 is energized to ensure proper light exposure before feeding the film. With control lever 27 engaging contacts 35 and 37 only, an independent galvanometer circuit of contact 35, battery 33, galvanometer 55 and contact 37 is completed. The connections for the galvanometer circuit components are metallic slip connections and therefore requires no wires.

Further clockwise movement of control lever 27 engages contact 36 which completes a motor circuit of contact 35, battery 33, motor 41 and contact 36 for energizing motor 41 to drive spur gear 43 which in turn feeds the film and intermittently passes light to the film by a segmented aperture (not shown) in the spur gear. The connection for the motor circuit components are metallic slip connections and therefore require no wires. With the control lever in the position shown in FIG. 3, the galvanometer circuit and the motor circuit, as previously identified, is energized at the same time.

Releasing the switch control 8 causes spring 22 to urge control lever 27 counterclockwise about post 21. Stop lug 47 rides along the edge 64 of the spur gear 43 until the notch 45 is in alignment with the stop lug 47 permitting the stop lug 47 to enter notch 45 and thereby permitting the control lever 27 to pivot counterclockwise. Control lever 27 first disengages contact 36 which deenergizes motor 41 and thereafter disengages contact 37 which deenergizes the galvanometer circuit placing the camera in a normal ineffective condition.

What is claimed is:

1. A control lever means for operating a movie camera comprising:
   a control lever movable from an ineffective position to an effective position;
   a galvanometer electrical circuit means including a first terminal contact energized by said control lever contacting said first terminal contact during a first portion of the movement to the effective position; and
   a motor electrical circuit means including a second terminal contact energized by said control lever contacting said second terminal contact during the later portion of movement to the effective position.

2. A control lever means as defined in claim 1 in which said motor electrical circuit means includes a shutter member operable thereby, said shutter member having a notch therein, said control lever having an integral stop lug seated in said notch when said control lever is in the ineffective position for preventing shutter movement.

3. A control lever means as defined in claim 2 in which said stop lug disengages said shutter member when said control lever moves from the ineffective position to the effective position for freeing said shutter member for rotation by said motor electrical circuit means.

4. A control lever means as defined in claim 1 further comprising a control switch being movable from a first position to a second position for pivoting said control lever from the ineffective position to the effective position, a rigid pin, and said control switch being movable from the second position to a third position to engage said pin for holding said control lever in the effective position.

5. A control lever means as defined in claim 4 in which said control switch is movable from the first position to an off position and has an abutment engageable with said pin to prevent moving said control switch to the second position.

6. A control lever means as defined in claim 1 further comprising a control switch operable from an off position to a run position and operable from the run position to a depressed position for moving said control lever to the effective position, and a rigid pin located to prevent said control switch from being depressed when in the off position.